(12) United States Patent
Gandhi (10) Patent No.: US 9,047,175 B2
(45) Date of Patent: Jun. 2, 2015

(54) SYSTEM AND METHOD FOR STORING AND MODIFYING DATA OBJECTS

(75) Inventor: Kamlesh Gandhi, Hyderabad (IN)

(73) Assignee: Gandhi Kamlesh, Hyderabad (IN)

( * ) Notice: Subject to any disclaimer, the term of this patent is extended or adjusted under 35 U.S.C. 154(b) by 50 days.

(21) Appl. No.: 13/698,607

(22) PCT Filed: May 18, 2011

(86) PCT No.: PCT/IN2011/000344
§ 371 (c)(1),
(2), (4) Date: Nov. 16, 2012

(87) PCT Pub. No.: WO2011/145114
PCT Pub. Date: Nov. 24, 2011

(65) Prior Publication Data
US 2013/0073830 A1  Mar. 21, 2013

(51) Int. Cl.
*G06F 12/02* (2006.01)
*G06F 12/10* (2006.01)

(52) U.S. Cl.
CPC ............ *G06F 12/023* (2013.01); *G06F 12/02* (2013.01); *G06F 12/0292* (2013.01); *G06F 12/10* (2013.01); *G06F 2212/657* (2013.01)

(58) Field of Classification Search
CPC .......... G06F 12/02; G06F 12/06; G06F 12/10
USPC ......................................... 711/165, 171, 202
See application file for complete search history.

(56) References Cited

U.S. PATENT DOCUMENTS

2010/0205231 A1* 8/2010 Cousins ..................... 707/823
2010/0318760 A1* 12/2010 So et al. ..................... 711/173
2011/0022566 A1* 1/2011 Beaverson et al. ........... 707/639

* cited by examiner

*Primary Examiner* — Than Nguyen
(74) *Attorney, Agent, or Firm* — Kenealy Vaidya LLP

(57) ABSTRACT

An embodiment of a data-processing-system for storing and modifying data-objects in a computing device, wherein a data-object is modified by direct insertion or removal of data within the data-object's storage-space. Data-objects may be of fixed, or variable-lengths. Data-objects may be nested. The length, name, data-type, value, and composition of a data-object may be modified. Other embodiments are described and shown.

10 Claims, 6 Drawing Sheets

| Field-Name | Description | |
|---|---|---|
| Len | Integer | 202 |
| Data-space | Variable-length space | 203 |

| Field-Name | Description | |
|---|---|---|
| Data-Type | String | 402 |
| Data-Space | Variable-length space | 403 |
| Data-Element | Data-Object | 404 |

1. Store new date-type in Data-type field — 501
2. Compare storage requirement for new data-element with size of data-space field — 502
3. If spare-required is more than size of data-space field, insert additional storage-space in data-space field — 503
4. If space-required is less than the size of data-space field, remove excess storage-space in data-space field — 504
5. Store the new value of the data-element in the data-space field — 505

Fig. 6A

| Addresses | 611 to 622 | 623 to 630 | 631 to 635 ||||| 636 to 643 | 644 to 650 |
|---|---|---|---|---|---|---|---|---|---|
| | | | 631 | 632 | 633 | 634 | 635 | | |
| Data Elements | 601 | 602 | 603 ||||| 604 | 605 |
| | | | Data-Len field | 603A | 603B | 603C | 603D | | |

Fig. 6B

| Addresses | 611 to 622 | 623 to 630 | 631 to 636 |||||| 637 to 644 | 645 to 651 |
|---|---|---|---|---|---|---|---|---|---|---|
| | | | 631 | 632 | 633 | 634 | 635 | 636 | | |
| Data Elements | 601 | 602 | 603 |||||| 604 | 605 |
| | | | Data-Len field | 603A | 603B | 603C | 603E | 603D | | |

Fig. 7

| Field-Name | Description | |
|---|---|---|
| Element-Count field | Integer | 702 |
| Data-object manager | | 703 |
|     Element-Sizes field | Variable-Length Array VA | 704 |
|     Data-Types field | Variable-Length Array VA | 705 |
|     Element-Names field | Variable-Length Array VA | 706 |
| Data-Space field | Variable-Length space | 707 |

- Increment Element-Count field — 801
- Insert element-size in Element-Sizes field — 802
- Insert data-type in Data-Types field — 803
- Insert name in Element-Names field — 804
- Insert required storage-space in Data-space field — 805
- Store value of new data-element in allocated storage-space — 806

Fig. 9

- Insert length of nested data-object. — 901
- Update Element-sizes field in the nested data-object's parent data-object. — 902
- Is parent data-object also nested in another data-object? — 903 (Yes → loop back to 902)
- ↓ No
- Done — 904

| Node | 1002 | 1003 | 1004 | 1005 | 1006 | 1007 | 1008 | 1009 | 1010 | 1011 | 1012 |
|---|---|---|---|---|---|---|---|---|---|---|---|
| Index | 1 | 2 | 3 | 4 | 5 | 6 | 7 | 8 | 9 | 10 | 11 |
| Address | 10 | 20 | 30 | 40 | 50 | 60 | 70 | 80 | 90 | 100 | 110 |

| Node | 1002 | 1003 | 1004 | 1005 | 1006 | 1007 | 1008 | 1013 | 1009 | 1010 | 1011 | 1012 |
|---|---|---|---|---|---|---|---|---|---|---|---|---|
| Index | 1 | 2 | 3 | 4 | 5 | 6 | 7 | 8 | 9 | 10 | 11 | 12 |
| Address | 10 | 20 | 30 | 40 | 50 | 60 | 70 | 80 | 90 | 100 | 110 | 120 |

SYSTEM AND METHOD FOR STORING AND MODIFYING DATA OBJECTS

This application is a U.S. national phase filing under 35 U.S.C. §371 of PCT Application No. PCT/IN2011/000344, filed May 18, 2011, and claims priority thereto under 35 U.S.C. §119 to Indian patent application no. 2846/CHE/2009, filed May 19, 2010, the entireties of both of which are incorporated by reference herein.

BACKGROUND OF THE INVENTION

1. Field of Invention

The invention relates to the organization of data objects on computers and other electronic devices. More particularly, it relates to composition of data objects and nested data objects, and insertion and removal of variable-length data in data-objects and nested data-objects at run-time.

2. Prior Art

A data-processing system, such as a computer or other electronic device, stores data objects in their storage-units, such as memory-regions, files or file-regions, data-structures, or the like.

A data-object comprises a number of data-elements organized in a logical manner. A data element may be a primary data-object or a composite data-object. A data-object that is itself an element of another data-object is called a child or nested data-object, and the other data-object is called the parent data-object.

For the purposes of data-composition, a distinction is made between a data-object and a pointer to the data-object. Thus, i. A data-object may be stored within another data-object's storage-space. The data-object is then called a child data-object, or a nested data-object.

ii. Alternatively, a data-object may be stored in its own storage-space. A pointer, reference, handle, or other address of the data-object is stored in another data-object. Thus, the data-object is not an element of the other data-object. Instead, the pointer, reference, handle, or other address is the child data-object, or nested data-object, in the other data-object.

Data-objects may be small, or large. A 'struct' in the C language is an example of a data-object. Data-structures and file structures may also be data-objects. A database, comprising a number of data-tables and indexes, is another example of a data-object. The amount of storage-space required or used by a data-object is called its size or length.

A storage-unit provides a number of sequential addresses in a logical address space, for storing data. Data-objects may be stored in storage-units such as memory-regions, files, or the like. Some data-structures (for example, an array) also provide a number of sequential logical addresses for storing data, and may be used as storage-units in which data-objects may be stored.

A storage-unit also has a physical address space—such as pages in memory, and sectors or clusters on disk. In some cases, the physical addresses may be the same as the logical addresses. However, in other cases, the physical addresses are distinct the logical addresses. In such cases, an association is maintained between a physical address and a logical address in order to provide access to the data.

How is storage-space allocated at run-time

Dynamic composition of data-objects, including modification of existing data-objects, requires additional storage-space. Usable, or free, storage-space may be found in a number of places:

1. Free storage-space may be allocated by creating a new storage-unit. Thus, a new memory-region, or a new file etc., may be created to provide storage-space.
2. Free storage-space may be found within a data-object if spare-space is reserved for the purpose.
3. Free storage-space may be provided by a heap, or other heap-like dynamic storage manager. The heap comprises a large memory-region from which it allocates a number of smaller sub-regions for storing variable-length data objects. Thus,
   a. The C language provides a 'malloc' function to allocate a number of bytes from a heap.
   b. In many file-structures, heap-like memory-managers track unused storage-regions and are used to dynamically provide storage-space.
4. Free storage-space may be allocated at the end of the logical address space. For example,
   a. A number of lines may be inserted in a text file by using storage-space at the end of a file.
   b. Many C compilers implement the 'alloca' function, which is used to allocate a variable-length memory region at the top of the process stack.

Each of these methods for allocating memory has its disadvantages. The choice of method used depends on the length of the data, the type of operations expected to be frequently performed on the data, and the need for speed.

Methods for Composition of Data-Objects

A number of methods for composition of data-objects exist. The choice of method usually depends on the characteristics of the data required to be stored, and the operations that are expected to be performed on the data. Each existing data-composition method has its strengths and weaknesses. No existing method is without its weaknesses. Further complications arise when data-objects are nested. Many of the advantages of a method may not be available when the data-object is nested.

The efficiency of a system depends on the methods used for composition of data objects, especially methods used for dynamic composition, including modification of existing data-objects.

The placement of a data element in relation to the parent data-object, or in relation to other data-elements in the parent data object, is of considerable importance. When data-objects are well-organized in a system, the system is able to perform at greater efficiency.

Some existing data-composition methods provide optimized placement of data-objects in the system, but provide rudimentary or no support for dynamic-composition or run-time modification of data-objects. Other methods provide efficient dynamic composition and run-time modification of data-objects, but fail to provide optimized placement of data-objects.

Dynamic composition and modification of data-objects is difficult because of many reasons. Some of the reasons are:

i. There is need to maintain variable-length data-elements in a data-object.
ii. There is need to maintain a variable-number of data-elements in a data-object.
iii. There is need to insert or remove data-elements in a data-object, including a nested data-object, at run-time.
iv. There is need to maintain a high level of efficiency of operations.
v. There is need to use the available storage-space judiciously.
vi. There is need to maintain the system free of errors.
vii. There is need to maintain order in the placement of the data after allocation of dynamic memory.

viii. Each method for allocation of dynamic memory has its disadvantages.

Hence, there is a need for a new method for composition of data-objects.

A number of books describe methods for composition of data-objects. For example,
i. "The 'C' Programming Language" by Kernighan and Ritchie, describes methods for composition of data-objects in the C language.
ii. The book "Data Structures and Algorithms" by Aho, Hoperoft and Ullman, describes methods for composition of data-structures.
iii. The book "File Structures, An Object-Oriented Approach with C++" by Folk, Zoellick, and Riccardi, describes methods for composition of data-objects for storage in a disk or a file.

Some commonly used methods for data-composition are discussed below:

1. Fixed, Equal-Sized Data Objects:

In accordance with a commonly used method of data-object composition, a number of fixed and equal-sized data-objects are stored at successive logical addresses in the storage-unit. This method is useful for maintaining a list of data-objects.

An example of this method is an 'array' in the C programming language. Another example is a data table stored in a file, comprising a number of fixed-length records. Each record can be directly accessed by its record-number. The relative position of a record is determined by multiplying the count of preceding records with the record-size. This method allows direct access of the data-objects. A yet another example of this method is a b-tree node in which a number of fixed and equal sized entries are stored.

As the lengths and relative-addresses of each element is known or easily determined, this method does not require the lengths or addresses of the data-elements to be tracked.

Insertion or removal of data in the data-object may be performed if the size of the storage-unit can be expanded, and the data-object is not bounded by another data-object in the storage-unit. Thus,
i. A number of additional entries may be inserted in a b-tree node, but limited by the amount of spare-space reserved in the b-tree node for the purpose.
ii. Additional records may be inserted in a data-table that is stored in its own file.

This method suffers from a number of disadvantages. Some of these are:
i. Insertion of data, beyond any storage-space reserved for such purpose beforehand, is not possible. It is also not always possible or advantageous to provide an unbounded logical address-space to stole a data-object.
ii. This method is unsuitable if the data-objects are not of fixed and equal sizes.
iii. This method does not establish a relationship, (such as a parent-child relationship, or other relationship), between data-objects.

Hence, this method is unsuitable for composition of data-objects, especially nested data-objects.

2. Delimited Data:

In accordance to another method, a number of variable-length data-objects are stored at successive logical addresses in the storage-unit. Each data-object is separated, or delimited, from its neighboring data-object by a 'separator' or 'delimiter'.

For example,
i. A 'line-feed' character is used to separate one line from another line in a text file.
ii. A comma or other delimiter is used to delimit fields in a comma-separated file.
iii. A variable-length entry may be separated from other entries in a b-tree node by a delimiter.
iv. An xml document uses the '<' and '/>' tags as separators.

Insertion of additional data may be performed if the data-object is stored in an unbounded address space, such as a file. Alternatively, insertion may be performed if spare storage-space is reserved within the data. When a character in the text file is inserted or removed, the succeeding lines in the file are moved to higher or lower logical addresses.

This method suffers from a number of disadvantages. Some of these are:
i. It is necessary to ensure that the 'separator' is not confused with the data objects.
ii. Insertion and removal of data in an unbounded data-object, beyond any storage-space reserved for such purpose beforehand, is not possible. In many cases, it is not possible or advantageous to provide unbounded address space to a data-object. Thus, insertion of entries in a b-tree node is limited by the size of the b-tree node.
iii. The relative addresses or lengths of the data-elements are not tracked, nor are they easily known. As such, this method does not provide direct access to a data object. For example, it is necessary to scan for line-break characters in a text file in order to access a predetermined line. Hence this method is not suitable if data is expected to be modified frequently, the amount of the data is large, or efficiency of the system is critical.
iv. The method does not establish a relationship between the data-objects, even though such a relationship may be described within the data. Thus, relationship of a data-object with another data-object (such as a parent-child relationship) is not readily inferred, and the entire data is required to be scanned before such relationship is determined.

3. Data-Type Based Organization:

In accordance with another method, the system maintains a 'data-type' or 'data-template' for a data-object. The data-type provides a storage-pattern for storing a number of data-elements in the data-object. The storage-pattern is used to determine the addresses of the data-elements.

This method is used in many programming languages. A struct in a 'C' language program is an example of this method. The method is also used in many file-structures. The storage-space allocated for a data-element may not be equal to the storage-space allocated for another data-element in the data-object. The system provides direct-access of a data-element. The address and the length of a data element are fixed, and as such there is no need to track the lengths or relative-addresses of the data-elements. This method allows composition of nested data-objects.

This method provides the ability to manage a limited amount of variable-length data. Typically, a moderately large amount of storage-space for storing a variable-length data-element is reserved. For example, a 'Student' data-type may comprise a 30-character-wide field for storing the name of a student. However, this has many disadvantages. Some of these disadvantages are:
i. The amount of storage-space is required to be estimated beforehand.
ii. It results in wastage of storage-space if the storage-space reserved is too large.
iii. It results in failure to store data if the amount of data required to be stored is larger than the reserved space.

4. Tracking Lengths or Addresses:

In accordance with another method, a number of variable-length data-elements in a data object are stored at a number of addresses in the data-object's storage-space.

Direct-access to the data-elements is provided by tracking the lengths of the data-elements. Alternatively, the addresses of the elements are tracked. As may be appreciated, these two methods are equivalent, and perform the same function—to provide access to a data-element without scanning the data. The addresses, offsets, lengths, cumulative lengths, data-offsets, or other relevant information may be stored in order to track the length or address of the data-elements.

For example, in a b-tree node, a number of variable-length entries may be stored. This may be done in a number of ways, some of which are:
 i. A length indicator is stored at the beginning of each entry.
 ii. Length-indicators of all the entries are stored in the node, followed by the entries.
 iii. The offsets of the entries are stored in the node, followed by the entries.
 iv. Cumulative-lengths of the entries are stored in the node, followed by the entries.

A limited amount of data may be inserted or removed in a data-object if spare storage-space is maintained for the purpose. Thus, a number of additional data-elements may be appended, inserted, or removed, in an existing data-object. Also, the length of a data-element can be increased or decreased, from time to time. This method is used in some b-trees to maintain variable-number of entries in a b-tree node.

There are several disadvantages to this method. Some of the disadvantages are:
 i. The amount of spare space required needs to be estimated beforehand.
 ii. It results in wastage of storage-space if the spare space is too large.
 iii. It results in failure to store data if the amount of data required to be stored is larger than the spare-space.

5. Array-Based Organization of Data-Objects

In accordance with another method, a number of data-objects are stored in a linear storage-space. A relationship is established between the data-objects, so that a data-object is related to a number of other data-objects.

For example, Aho, Hoperoft, and Ullman describe a method for composition of a tree data-structure in a linear array (see section 'An Array Representation of Trees' in the book 'Data Structures and Algorithms', Addison Wesley Publishing Company, 1983, page 84). The authors also describe methods to traverse the tree. Here, a relationship of a node in a tree with a number of child-nodes in the tree are represented.

In some cases, insertion and removal of data is provided by storing new data at the end of the file. Thus, for example, a 'Student' field in a record in a file may be replaced by a larger field by
 i. allocating a new data-region at the end of the file for storing the new larger field,
 ii. invalidating the existing field in the data-object in the file, and
 iii. in its place, storing a pointer to the new data-region at the end of the file.

However, insertion and removal of data using this method has a number of disadvantages:
 i. The method creates a number of small data-regions each time a modification is made to the data, leading to inefficiency in accessing data.
 ii. Locality of reference is not preserved as a result of the method, resulting in a large number of page-faults and cache-misses, and inefficiency of operations of the system.
 iii. A number of unused, invalidated data-regions in the file are created, when a modification is made to the data.
 iv. The data is not maintained in its most optimal manner. With each modification, more and more disorder is introduced in the data.
 v. The data must be periodically re-written to a new file, in proper order, in order to regain efficiency of operation.

6. Re-Creating the Data-Object

In accordance with this method, a data-object may maintain variable-length data, by re-creating the data-object when a new data-element is inserted, removed or modified. For instance,
 i. In the C language, an array may store a fixed number of elements. In order to insert an additional element, a new array is created by allocating new memory-space. A number of existing elements in the original array are then copied to the new array, along with the new element. The original array is then usually discarded, and the new array is used in its place.
 ii. In order to insert a data-element in a file, the contents of the original file may be copied to a new file, along with the new data-element. The original file is then usually discarded, and the new file is used in its place.

This method is inefficient as it involves accessing or copying large amounts of data.

As a consequence of the disadvantages listed above, each of the methods discussed above is of unsuitable for dynamic composition of data-objects, especially nested or large data-objects.

7. Heap-Based Storage of Data

In accordance to another method, variable-length data is stored using storage-space allocated from a heap. The data-object does not store the data itself. Instead, the data-object stores a pointer, reference, or other handle, to the data. For the purposes of data-composition, the pointer, reference or other handle is the child-element in the data-object.

This method thus provides the ability to store variable-length data in a data-object. It does not require that the length of the data to be known beforehand. This method is thus more flexible than the other methods discussed above.

This method is also used in many file-structures. The organization of a b-tree in a file is another example of this method. In a b-tree, a heap-like dynamic memory manager is used to track unused storage-regions to provide dynamically allocate storage-space.

However, this method also suffers from a number of disadvantages. Some of the disadvantages are:
 i. This method requires management of the unused storage-regions in the heap.
 ii. Management and tracking of data-elements required by this method is the cause of many failures.
 iii. This method results in fragmentation of storage-space, and increased number of page faults and cache-misses, thereby slowing down the system.
 iv. Locality of reference is not preserved, thereby causing inefficiencies.
 v. This method results in creation of regions of unusable storage-space.
 vi. It is usually not possible to store the data at their most optimal locations.

OBJECTS OF THE INVENTION

The objects of the invention are to provide a data-processing system wherein a number of data-objects are stored, and in which a number of operations may be performed, as discussed below. A data-object in the data-processing system comprises a number of fixed or variable-length data-elements. The data-objects may be nested. Direct access is provided to a data-element in a data-object. A data-element in a data-object may be accessed by its index or by name.

In accordance with the invention, a method is provided for composition of data-objects, and modification of data-objects at run-time, by inserting or removing storage-space into the data-object. The method does not require a heap. The method also does not require spare storage-space to be reserved. The method allows placement of data-elements in a data-object in a logical and efficient order. Locality of reference is preserved even after a number of data-elements are inserted or removed.

The length, data-type, name, or value of a data-object may be modified from time to time. A number of data-elements may also be inserted or removed in the data-object. The modifications may also be performed in a nested data-object. The method provides the ability to express and maintain relationships between a data-object with one or more other data-objects.

Advantages of the Invention

There are a number of advantages of the invention.
i. The method provides the ability to store variable-length data, without requiring the use of pointers. A data-object may comprise a variable-number of data-elements. The length of a data-object may vary from time to time. The size of the data-elements is not required to be fixed or equal.
ii. The method supports insertion and removal of data in nested data-objects. There is no need to reserve spare-space to support insertion of additional data.
iii. The method supports storage of data-elements in their most optimal locations.
iv. The method allows the system to run more efficiently.
v. This method allows direct-access of a data-element, even after insertion or removal of data.
vi. The method is useful for providing access to a data-element by its name, or by its index.
vii. Fragmentation, page-faults, and cache-misses are reduced. Locality of reference is maintained, even after insertion or removal of data.
viii. There is no need to maintain or manage dynamically allocated storage-spaces.
ix. The problem of unusable storage-regions in the heap is reduced.
x. The method is useful for modifying the data-type of a data-element.
xi. The method is useful for maintaining default-values for a missing data-element.

DRAWINGS

In the drawings, closely related figures have the same number but different alphabetic suffixes.

| Drawings - Reference Numerals | |
| --- | --- |
| 101 | Data processing system |
| 102 | Storage-unit |
| 103 | Data-objects |
| 104 | Logical Addresses |
| 201 | Variable-length array VA |
| 202 | Len field |
| 203 | Data-space field |
| 301-303 | Steps in flowchart |
| 401 | Variable-typed data-object VTDO |
| 402 | Data-type field |
| 403 | Data-space field |
| 404 | Data-element |
| 501-505 | Steps in flowchart |
| 601-605 | Data-objects |
| 603A-603D | Data elements in data-object 603 |
| 611-651 | Logical addresses |
| 701 | Composite data-object |
| 702 | Element-count field |
| 703 | Data-object manager |
| 704 | Element-sizes field |
| 705 | Data-types field |
| 706 | Element-names field |
| 707 | Data-space field |
| 801-806 | Steps in flowchart |
| 901-904 | Steps in flowchart |
| 1001 | Hierarchical Data Structure HDS |
| 1002-1013 | Nodes in HDS |
| 1101 | Data-processing system |
| 1102 | Data-objects |
| 1103 | Virtual-memory-region |
| 1104 | Logical address space |
| 1105 | List of pages |
| 1106 | Memory-management-unit |
| 1201-1203 | Steps in flowchart |
| 1301 | Data-processing system |
| 1302 | Data-objects |
| 1303 | Virtual-memory-region |
| 1304 | Logical address space |
| 1305 | List of pages |
| 1306 | Memory management unit |
| 1307 | Page-swapping device |

DESCRIPTION OF THE INVENTION

In accordance with a preferred embodiment of the invention, a data-processing system is provided for storing a number of data-objects.

A method is provided for modification of the data-objects at run-time. Additional data may be inserted into a data-object, whereby one or more additional data-elements are inserted, and/or the length of a data-object is increased. Similarly, existing data in a data-object may be removed, whereby one or more data-objects in the data-processing system are removed, and/or the length of a data-object is reduced.

The following steps are performed for insertion of data:
i. A logical address within the storage-unit is identified for storing the additional data.
ii. Additional storage-space is inserted into the storage-unit for storing the additional data at the logical address so identified. Thereby, one or more existing data-objects stored beyond the said logical address may be moved from their existing logical addresses to higher logical addresses.
iii. The additional data is stored in the storage-space inserted, thereby inserting an additional data-object in the system, or increasing the length of a data-object.
iv. The additional data-object may also be inserted as a child-object of another data-object. If the data-object is inserted as a child data-object, the length of the parent data-object is also increased as a consequence.

The process of removal of a data-element is the reverse of the above.

During insertion or removal of data, a number of data-elements stored in the parent data-object's storage-space beyond the point of insertion or removal may be relocated to new logical addresses in the storage-unit. A number of other data-objects in the storage-unit may also be relocated to new logical addresses.

A data-object manager stores the relative-addresses, lengths, data-type or other information relating to the data-elements in a data-object as may be necessary, to track addresses of the data-objects. Thus, direct access to data-objects is provided. The data-object manager is updated during insertion or removal of data.

The data-object manager stores the names of a number of data-objects in the system, or in a data-object. The method allows a data-element to be accessed by its name. The name of a data-object may also be modified from time to time.

The data-object manager stores the data-type of a data-object. The data-type of a data-object may also be modified from time to time. The data-type or data-template of a data-object may be used to define the structure of the data-object. The data-type of a data-object may also be used to define default-values for missing data-elements in the data-object.

The method of storing a number of data-elements in a hierarchy is also shown.

Other embodiments show the use of this method wherein the data is stored in a virtual-memory region.

The data-processing-system stores the data-objects in a storage-unit wherein data can be efficiently inserted or removed, as discussed hereunder.

Storage-Units in Data-Object Composition

Most commonly used storage-units used do not provide the ability to efficiently insert or remove data. Generally, the amount of time taken to insert or remove data in a storage-unit depends on the amount of data in the storage-unit beyond the point of insertion or removal. Thus, if the amount of data in the storage-unit beyond the point of insertion is large, a correspondingly large amount of time is taken to insert data. This makes insertion and removal of data impractical. Insertion and removal operations in these storage-units are said to be of the order O(n), where n is the amount of data in the storage-unit.

However, some other storage-units provide efficient insertion or removal of data. In these storage-units, the amount of time taken to perform insertion or removal does not depend on the amount of data beyond the point of insertion or removal. Some examples of these storage-units are:
i. My invention (Patent Application No PCT/IN2010/000259) describes a storage-system that provides efficient insertion and removal of data in storage-units, such as file-systems and memory-systems.
ii. My invention (Patent Application No PCT/IN2010/000641) describes a virtual memory system which uses variable-sized pages, and provides efficient insertion and removal of data in a virtual memory system.
iii. Flash-optimized file system described by Sinclair, Alan Welsh (Patent Application No PCT/UD2007/088165) is a file system that provides efficient insertion or removal of data in a flash-based file system.
iv. A counted b-tree, described by Simon Tatham, is a form of the b-tree data-structure, which supports insertion or removal of an item in an unsorted b-tree at a specified index (http://www.chiark.greenend.org.uk/~sgtatham/algorithms/cbtree.html).

These other storage-units re-locate data beyond the point of insertion or removal to new addresses without accessing or copying the data. Instead, the storage-units relocate data by dissociating the physical addresses of the data from their logical addresses, and re-associating the physical addresses with new logical addresses. Consequently, these storage-units provide greater efficiency for insertion or removal of data. Thus, i. A storage-unit (such as a file or a memory region) of my invention (number i. above) provides a number of logical addresses for storing data. The storage-unit also comprises a list of variable-sized storage-blocks in which data is physically stored. A storage-block may also comprise spare-capacity. The addresses in the storage-blocks are mapped to the logical address space. The logical address of data in a storage-block depends on the used capacity in the preceding storage-blocks.

The storage-unit, thus, maintains spare-capacity within its storage-blocks. Additional spare capacity in the storage-unit may be inserted by inserting additional storage-blocks in the list. When data is inserted in the file, this spare capacity is used.

As a consequence of the insertion, data in the storage-unit beyond the point of insertion are relocated to higher logical addresses. The re-location, thus, does not require copying or moving of data from their physical addresses to new physical addresses. The storage-block and the physical addresses of the relocated data remain unchanged.

In a virtual memory system described in my invention (number ii. above), a number of variable-sized pages may be mapped to a virtual-address region, using a mapping device such as a page-table or a Translation Lookaside Buffer (or TLB).

In a virtual memory-region provided by the system, additional data may be inserted at a predetermined point of insertion by un-mapping a number of pages from the virtual-address space, and re-mapping the same to new virtual-address spaces. Thus, the data in the pages are relocated to new logical addresses without moving the same from their physical addresses. One or more additional pages are mapped at the point of insertion, in order to provide storage-space for the inserted data. Thus, data may be inserted or removed from the memory region without copying or moving large amounts of data from their physical addresses.

A flash-optimized file system (number iii. above) describes a method for insertion of data in a file in a flash-based storage-medium, by re-mapping a number of physical addresses to a number of new file-addresses. A number of data-objects stored beyond the point of insertion are not required to be physically re-located to new addresses in the physical medium during insertion.

A counted b-tree (number iv. above) stores a number of entries in a number of nodes. An entry may be stored, retrieved, inserted, and removed, at an index in the counted b-tree, without the use of a key.

By storing a byte as an entry in the b-tree, a logical address space may be created. The indexes of the entries may be considered the logical addresses of the data. A counted b-tree may be used as a storage-unit for purposes of data-composition.

Each node in the b-tree may be considered a storage-block, providing a number of physical addresses at which the entries are stored. Each physical address in a node, at which an entry is stored, is associated with a logical address, or index in the b-tree.

When a new entry is inserted in the b-tree, a small number of entries in a few nodes are re-arranged. This causes a large number of entries at indexes beyond the point of insertion to be moved to higher indexes. Thus, a number of entries in the counted b-tree are relocated to higher addresses by changing the association of the physical addresses with logical addresses. The large number of entries are not accessed or physically copied during insertion.

The order of efficiency of insertion and removal of data, in these other storage-units, is better than $O(n)$, where n is the amount of data in the storage-unit. For instance, efficiency of insertion and removal of data in a b-tree (and thus a counted b-tree) is said to be of the order $O(\log n)$.

Existing data-object composition methods do not take advantage of the capabilities of these other storage-units. My invention proposes to take advantage of the capabilities of fast insertion and removal of data provided by these storage-units. For the purposes of the invention, the storage-unit used to store data-objects may also be any other storage-unit that does not suffer from the inefficiencies discussed above.

DETAILED DESCRIPTION OF THE INVENTION

The invention will now be described in conjunction with the drawings.

Figure 1:
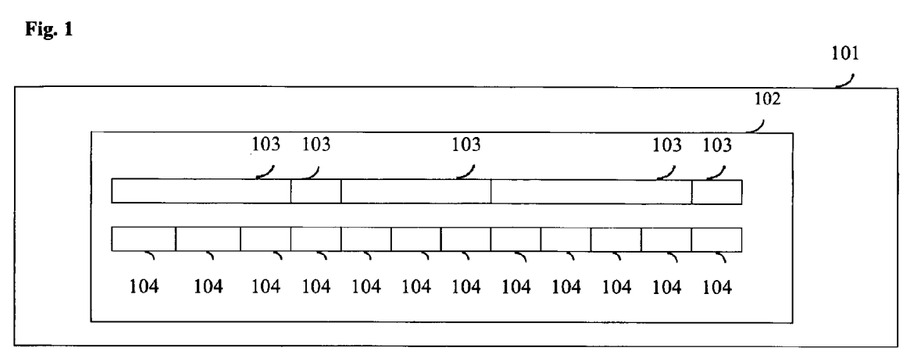
FIG. 1 shows a data-processing system in accordance with an embodiment of the invention.

A preferred embodiment of the data-processing system is illustrated in FIG. 1. Data-processing system 101 comprises a storage-unit 102, and a number of data-objects 103 stored at sequential logical addresses 104 in the storage-unit.

Storage-unit 102 is a file, memory-region, data-structure, or other storage-unit that provides efficient insertion and removal of data, as discussed in the previous section.

A data-object 103 in the data-processing system may be a pre-existing data-object, or a data-object that is created at run-time. A data-object in the data-processing system may be a 'struct', an 'array', a 'length-based' data-object, a data-structure, a file-structure, or any other data-type described previously, or an instance of one of the data-objects described hereunder, or the like. A data-object may also be a child data-object of another data-object.

A number of operations that are performed on the data-processing system are described hereunder, in conjunction with drawings.

Figure 2:
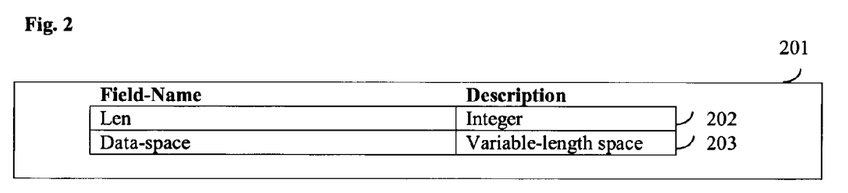
FIG. 2 shows a variable-length array VA, wherein a number of data-elements may be inserted or removed at run-time.

FIG. 2 shows the data-template of a variable-length array VA 201. VA 201 is a composite data-object, and is used to store a number of fixed-sized data-elements within its storage-space. VA 201 comprises:
  i. Len field 202; and
  ii. Data-space field 203.

Data-space field 203 represents space reserved for storing a number of elements in VA 201. Len field 202 is an integer field, and is used to store the length of Data-space field 203.

However, data-space field 203 does not reserve any spare-space.

When an instance of VA is created, Data-space field is created to be large enough to stole a predetermined number of fixed-sized records. The length of Data-space field is stored in Len field. The total storage-space allocated for VA is equal to the sum of the length of Data-space field, and the length of Len field. The data-elements are stored in Data-Space field.

Figure 3:
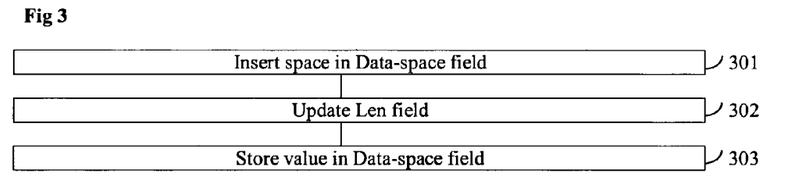
FIG. 3 is a flowchart showing the method of insertion or removal of additional data-elements in variable-length array VA.

An additional data-element may be inserted in VA from time to time. FIG. 3 is a flow-chart showing the method of insertion of a data-element in VA. Accordingly,
  i. At step 301, additional storage-space, equal to the size of the new record, is inserted in the storage-unit 102, whereby
    a. one or more existing data-objects in the data-processing system 102 at and beyond the point of insertion are moved to higher addresses; and
    b. the length of Data-space field 303 is increased;
  ii. At step 302, the value of Len field is updated; and
  iii. At step 303, the new data-element is stored in the Data-space field.

The process of removal of data-elements in VA is the reverse of the process of insertion.

When additional storage-space is inserted in Data-space field, one or more data objects stored in the storage-unit 102 at and beyond the point of insertion in the storage-unit are moved to higher addresses, and the size of VA is increased. Similarly, when storage-space in VA is removed, one or more data objects beyond the point or removal are moved to lower addresses, and the size of VA is decreased.

When the length of VA is thus modified, one or more of the existing data-elements in VA are moved to new addresses. Thus, if VA is itself a child of another data-object, one or more data-elements in the parent-object may be re-located when a data-element is inserted or removed in VA.

Figure 4:
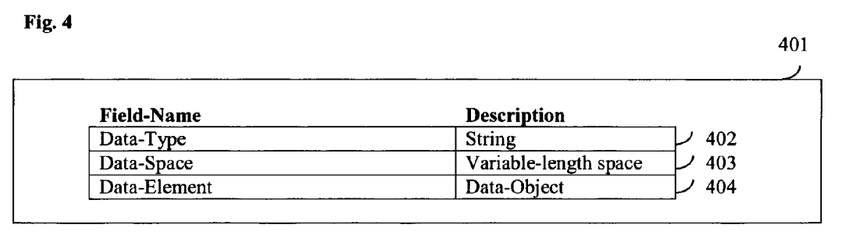
FIG. 4 shows a variable-typed data-object VTDO, which is used to store a data-element, whose data-type may be modified from time to time.

FIG. 4 shows a variable-typed data-object VTDO 401. The VTDO 401 is used to store a single data-element. The data-type of the data-element stored in VTDO 401 may vary from time to time, as explained below.

As shown in FIG. 4, VTDO 401 comprises:
  i. Data-type field 402;
  ii. Data-space field 403; and
  iii. Data-element 404.

Data-type field 402 is used to store the data-type of Data-element 404.

Data-space field 403 represents space reserved for storing Data-element 404, in accordance with the data-type stored in Data-type field 402.

Data-element 404 is stored within the Data-space field 403.

When an instance of VTDO is created, Data-type field is used to store a predetermined data-type, and Data-space field is provided with adequate storage-space to store an instance of the predetermined data-type. The total storage-space allocated for VTDO is equal to the sum of the storage-space allocated for Data-type field, and size of Data-element.

Figure 5:
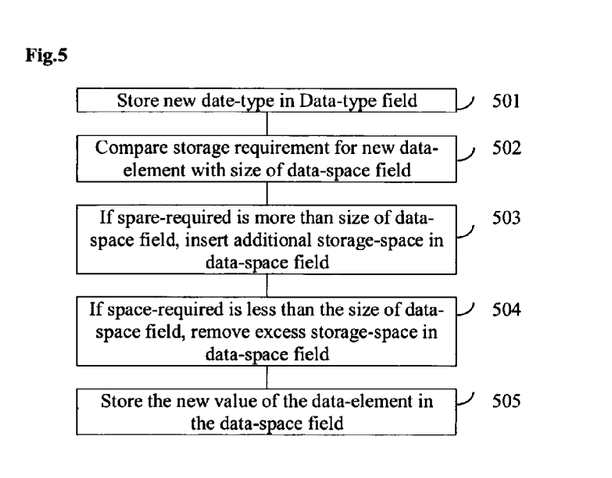
FIG. 5 is a flow-chart showing the method of modification of the data-type of the data-element stored in the variable-typed data-object VTDO.

The data-type of the Data-element 404 may be modified from time to time. FIG. 5 is a flow-chart showing the method of modifying the data-type of Data-element. Accordingly,
  i. At step 501, the new data-type is stored in Data-type filed.
  ii. At step 502, the storage-requirement for the new data-type is compared with the amount of storage-space already allocated to Data-space field.
  iii. At step 503, if the storage-requirement for the new data-type is greater than the existing length of Data-space field, additional storage-space is inserted into the Data-space' field, and thereby increasing the size of VTDO.
  iv. At step 504, if the storage-requirement for the new data-type is less than the existing length of Data-space field, the excess storage-space in the Data-space field is removed, thereby decreasing the size of VTDO.
  v. At step 505, the value of Data-element, in accordance with new data-type, is stored in Data-space field.

A number of data-objects stored beyond VTDO in data-processing system 101 may be moved to new logical addresses in storage-unit as a result of the insertion or removal of storage-space.

Figure 6A:
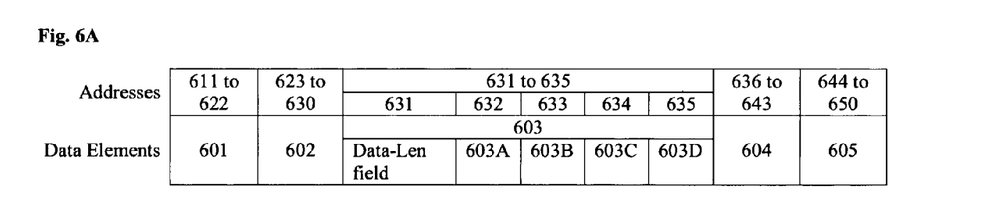
FIG. 6A and FIG. 6B show the placement of data-objects in the storage-unit before and after insertion of a data-object in the data-processing system.
Figure 6B:
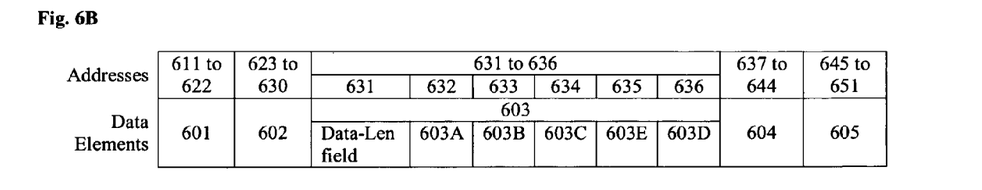

FIGS. 6A and 6B show the placement of data-objects in an exemplary data-processing system, in the storage-unit before and after insertion of a data-object, respectively.

FIG. 6A shows the addresses of a number of data-objects before insertion. Accordingly, data-objects 601, 602, 603, 604, and 605 are stored at addresses 611 to 622, 623 to 630, 631 to 635, 636 to 643, and 644 to 650, respectively in the storage-unit. Data-object 603 is a variable-length array VA, and is the parent-object of data-elements 603A, 603B, 603C and 603D. The Len-field of VA is stored at address 631. Data-elements 603A, 603B, 603C and 603D are stored at addresses 632, 633, 634, and 635 respectively.

FIG. 6B shows the addresses of the data-objects after insertion of an additional data-element in data-object 603. An additional data element 603E is inserted in data-object 603 after data-element 603C. The data objects 601, 602, 603, 604, and 605 are now stored at addresses 611 to 622, 623 to 630, 631 to 636, 637 to 644, and 645 to 651, respectively. The Len-field of VA is stored at address 631. Data-elements 603A, 603B, 603C, 603E, and 603D (in data-object 603) are stored at addresses 632, 633, 634, 635, and 636 respectively.

Figure 7:
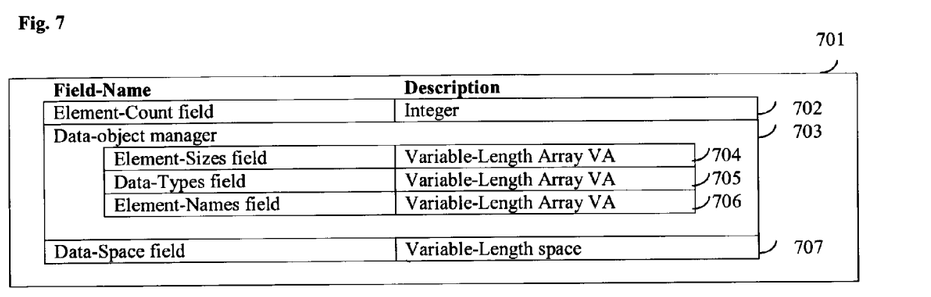
FIG. 7 shows a composite data-object CO, in which a number of variable-length data-objects may be stored, modified, inserted, removed.

FIG. 7 shows a composite object CO 701, which is a data-object in which a number of variable-length data-elements are stored. The number of data-elements in CO is not fixed. A number of data-elements may be inserted or removed in CO from time to time. The sizes of the data-elements in CO are variable. The size of one data-element is not required to be equal to the size of another data-element. The size of a data-element may be modified from time to time.

As shown in FIG. 7, CO 701 comprises
  i. Element-Count field 702;
  ii. Data-object manager 703;
  iii. Data-Space field 707.
Data-object manager 703 comprises
  i. Element-sizes field 704;
  ii. Data-types field 705; and
  iii. Element names field 706.

Element-Count field 702 is an integer field, and is used to store the count of elements in CO. The value in this field is updated when an element is inserted or removed in CO.

Data-object manager 703 is used to track the lengths, data-types and element-name of the data-elements stored in CO.

Element-Sizes field 704 is an instance of VA 201, and is used to store a list of integers. Each entry in this array represents the size of the corresponding data-element stored in CO.

Data-Types field 705 is an instance of VA 201, and is used to store a list of data-types. Each entry in this array represents the size of the corresponding data-element in CO.

Element-Names field 706 is an instance of VA 101, and is used to store a list of names. Each entry in this array represents the name of the corresponding data-element in CO.

Data-Space field 707 represents space reserved for storing a number of elements in CO. Data-space field 707 does not reserve any spare-space.

A data-element stored in CO may be accessed by its index or position. The relative address of a data-element can be found by summing the sizes of preceding data-elements. The data-element may be accessed at the relative address within Data-Space field.

A data-element stored in CO may also be accessed by its name. The name of each data-element may be found in Element-Names field.

An instance of an empty CO is created by
  i. Setting the value in Element-Count field to zero;
  ii. Creating an empty Element-Sizes field;
  iii. Creating an empty Data-Types field;
  iv. Creating an empty Element-Names field; and
  v. Creating an empty Data-Space field.

Figure 8:
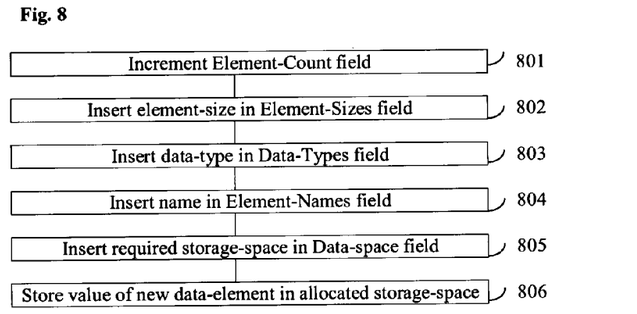
FIG. 8 is a flowchart showing the method of insertion of an additional data-object in composite object CO.

A number of data-elements may be inserted in CO from time to time. FIG. 8 shows a flowchart showing the method of insertion of an additional data-element in CO, at a predetermined index. Accordingly,
  i. At step 801, the value of the Element-Count field is incremented;
  ii. At step 802, an integer value is inserted in the Element-Sizes field at the predetermined index, to indicate the size of the new data-element.
  iii. At step 803, a data-type value is inserted in the Data-Types field at the predetermined index, to indicate the data-type of the new data-element.
  iv. At step 804, a name value is inserted in the Element-Names field at the predetermined index, to indicate the name of the new data-element.
  v. At step 805, storage-space equal to the size of the new data-element is inserted at the appropriate position in the Data-Space field, whereby
    a. the length of the Data-Space field is increased; and
    b. existing data-elements at and beyond the point of insertion are moved to higher addresses;
  iv. At step 806, the new data-element is stored in the storage-space inserted in step 805.

The process of removal of data-elements in CO is the reverse of the process of insertion.

When additional storage-space is inserted in CO, one or more data at and beyond the boundaries of the data-object are moved to higher addresses. When excess storage-space in VA1 is removed, one or more data at and beyond the boundaries of the data-object are moved to lower addresses.

Thus, addresses of one or more other data-elements may be modified. Similarly, if the data-object is itself a child of another data-object, the addresses of one or more data-elements in the parent-object may be modified when storage-space is inserted into CO.

The size of a nested data-object may also be modified at any time. For example, a VTDO is a nested data-element stored at a predetermined index in CO. When the size of the data-element is modified, the corresponding entry in Element-Sizes field is updated. The method ensures that all data-objects are accessible at their existing or new addresses after the insertion or removal of data. Thus, data may be inserted or removed in a data-object at any time, including in nested data-objects.

Figure 9:
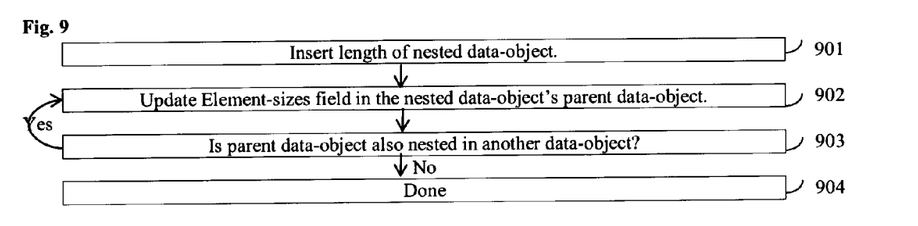
FIG. 9 is a flowchart showing the method for inserting additional data-elements in a nested data-object.

FIG. 9 shows a flowchart for inserting additional data-elements in a nested data-object, which is nested in CO. Accordingly,
   i. At step 901, the length of a nested data-object is increased by inserting an additional data-element in the nested data-object. Consequently, one or more data-objects in the storage-unit beyond the nested data-object are moved to new addresses. The next step is step 902.
   ii. At step 902, the length of data-object is updated in the Element-Sizes field in CO. The next step is 903.
   iii. As a consequence of steps 901 and 902, the size of the parent data-object CO is also modified. At step 903, if CO is nested in another data-object, the new length of CO is updated in its parent data-object's Element-Sizes field by performing step 902. Else the next step is 904.
   iv. At step 904, the process of insertion of data in a nested-object is complete.

A number of variations are possible. For example,
   i. In the data-object manager in CO, in place of Element-sizes field, an Element-Addresses field may be substituted. The Element-Addresses field keeps track of the relative addresses of the data-elements stored in the CO.
   ii. The Data-types field may be used to track the data-types, and thereby the lengths of the data-elements. In such a case, Element-sizes field may not be required.
   iii. The Data-types field may not be required if the data-type of each data-element is the same or can be otherwise determined.
   iv. The Element-names field may not be required if the data-elements are not required to be accessed by name.
   v. The method can easily be enhanced to provide default values for missing data-elements. For example, default values of missing elements in a data-object may be defined in the data-object's data-template.

Figure 10A:
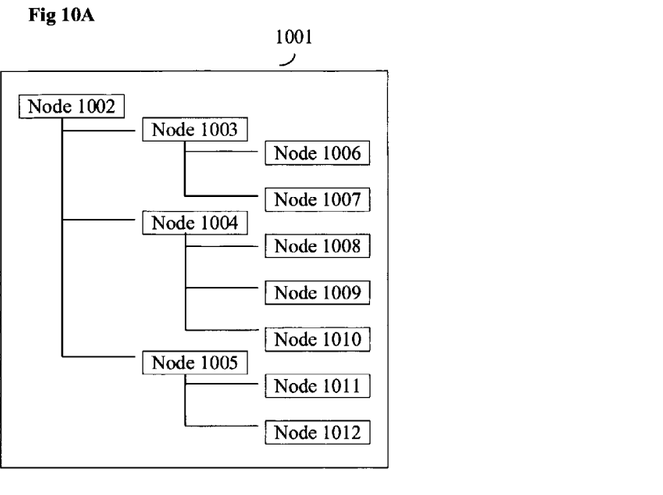
FIG. 10A, 10B, 10C and 10D show a hierarchical data structure HDS, wherein data-elements are arranged in a hierarchy.
Figure 10B:
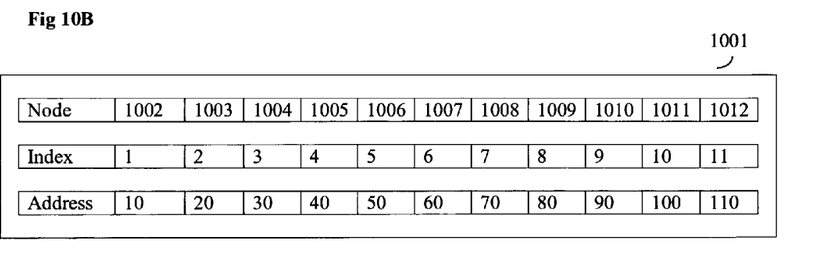

FIG. 10A and FIG. 10B show a hierarchical data-structure HDS 1001, in accordance with the invention. Hierarchical data-structure HDS 1001 is a data-object in which a number of data-elements are arranged in a hierarchy. Each data-element in the hierarchy is a node, which may have sub-nodes.

FIG. 10A shows a schematic diagram of the relationship between the nodes in HDS. According to FIG. 10A, node 1002 is the root node of the hierarchy. Node 1002 has three sub-nodes, viz. nodes 1003, 1004 and 1005. Node 1003 has two sub-nodes, viz. nodes 1006 and 1007. Node 1004 has three sub-nodes: node 1008, node 1009 and node 1010. Node 1005 has two sub-nodes: node 1011 and node 1012. Each node has a length of 10 bytes.

Each node has an index. The index of a node is its position in relation to the other nodes in the hierarchy, when traversed using level-order traversal, or breadth-first traversal. Accordingly, indexes of nodes 1002, 1003, 1004, 1005, 1006, 1007, 1008, 1009, 1010, 1011 and 1012 are 1, 2, 3, 4, 5, 6, 7, 8, 9, 10 and 11 respectively. The address of a node within the data-object is determined by its index.

FIG. 10B shows the addresses of the nodes in the storage-unit. Accordingly, nodes 1002, 1003, 1004, 1005, 1006, 1007, 1008, 1009, 1010, 1011 and 1012 are stored at addresses 10, 20, 30, 40, 50, 60, 70, 80, 90, 100 and 110 respectively.

Figure 10C:
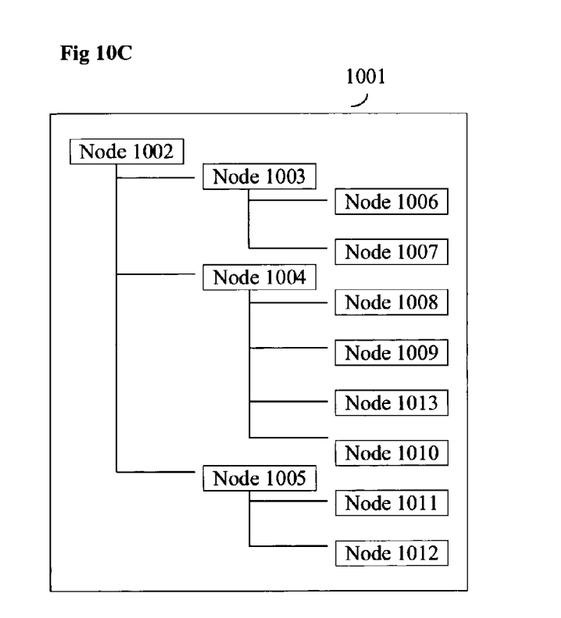
Figure 10D:
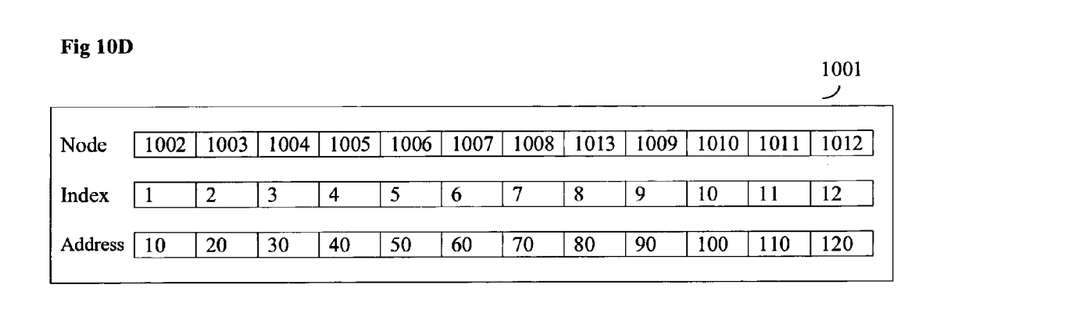

FIG. 10C and FIG. 10D show the hierarchical data-structure HDS 1001, after insertion of an additional node in the hierarchy.

FIG. 10C shows a schematic diagram of the hierarchical data-structure HDS 1001. Accordingly, an additional node, viz. node 1013 has been inserted as a sub-node in node 1004, after sub-node 1008.

FIG. 10D shows the address of the nodes, after insertion of the additional node. The indexes of the nodes 1002, 1003, 1004, 1005, 1006, 1007, 1008, 1013, 1009, 1010, 1011, and 1012, after insertion of the additional node are 1, 2, 3, 4, 5, 6, 7, 8, 9, 10, 11, and 12 respectively. Nodes 1002, 1003, 1004, 1005, 1006, 1011, 1007, 1008, 1009 and 1010 are stored at addresses 10, 20, 30, 40, 50, 60, 70, 80, 90 and 100 respectively.

The relationships between data-objects may be expressed with even greater flexibility if the data-elements are not fixed-sized, but are variable-sized. The use of variable-sized data-objects has already been shown in detail hereinabove.

Figure 11:
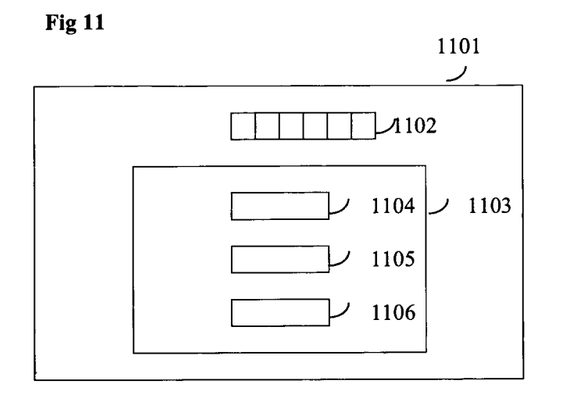
FIG. 11 shows a data-processing system wherein the data is stored in a virtual-memory-region with variable-sized pages.

FIG. 11 shows another preferred embodiment of the invention. Accordingly, data-processing system 1001 comprises
   i. a number of data-objects 1102; and
   ii. a virtual memory region 1103;
   Virtual memory region 1103 comprises
   i. a logical address space 1104;
   ii. a list of pages 1105; and
   iii. a memory-management-unit 1106.

List of pages 1105 in the virtual-memory system comprises a number of pages, each page providing a number of physical addresses for storing the data in the virtual memory region. The size of a page is not fixed, and the size of a page may differ from the size of another page in the list.

Memory-management-unit 1106 comprises a page-table, TLB or other device for mapping a number of physical addresses in a page to a number of logical addresses in the virtual memory region. The memory-management-unit is capable of mapping a number of variable-sized pages to the logical address space. For example, the memory-management-unit described in my invention (Patent Application No PCT/IN2010/000641) may be used.

Each variable-sized page in the page-table-entry is associated with a logical address. The memory-management-unit is used to map a page to its associated logical address. The logical address of a page is determined by the number of bytes in the preceding pages in the list.

Figure 12:
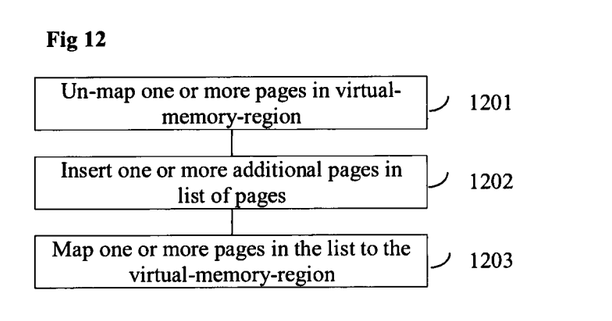
FIG. 12 shows a flowchart for inserting additional data in a data-processing-system using a virtual-memory-region.

A number of additional bytes may be inserted into the virtual-memory region from time to time. FIG. 12 shows a flowchart for inserting a number of additional bytes in the virtual-memory region. Accordingly,
   i. At step 1201, a number of pages in the memory management unit are unmapped, by marking the corresponding page-table-entry with a 'Not Present' value.
   ii. At step 1202, one or more additional pages, of the appropriate size, are inserted into the list of pages. This has the effect of
      a. moving one or more other pages in the list to higher logical addresses; and
      b. inserting additional data in the virtual-memory-region.
   iii. At step 1203, one or more pages in the list are mapped to the virtual-memory-region, by marking the corresponding page-table-entry with a 'Present' value.

The method of removal of data in the virtual-memory-region is the reverse of the above.

This method is used to insert or remove a number of additional data-objects in the data-processing-unit. The other details of insertion of data in the data-processing-unit are already described previously.

Figure 13:
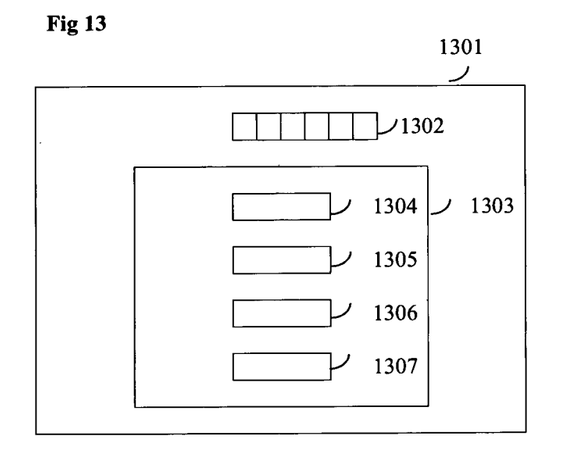
FIG. 13 shows a data-processing system wherein the data is stored in a virtual memory region with fixed sized pages.

A number of variations are possible. For example, FIG. 13 shows a data-processing system 1301. Accordingly, data-processing system 1301 comprises:
   i. a number of data-objects 1302; and
   ii. a virtual memory region 1303;
   The virtual memory region 1303 comprises
   i. a logical address space 1304;
   ii. a list of pages 1305;

iii. a memory-management-unit 1306; and
iv. a page-swapping device 1307.

List of pages 1305 comprises a number of fixed-sized pages. Memory-management-unit 1306 may be any memory management unit that maps fixed sized pages to the virtual-memory-region.

The memory-system also comprises page-swapping device 1307. Page-swapping device 1307 is a file described in my invention (PCT/IN2010/0000259). The file supports efficient insertion and removal of data, as previously discussed. The page-swapping device is used to extend the logical address space by using disk-space. The pages may, from time to time, be located in physical memory, or in the page-swapping device.

A number of additional bytes may be inserted into the virtual memory region, by
  i. invalidating one or more page-table-entries in the memory-management unit, and un-mapping one or more pages from the logical address space;
  ii. inserting additional storage-space into the file, by
    a. using spare-capacity in a storage-block; or
    b. inserting additional spare capacity in the file by inserting one or more additional storage-blocks;
  iii. mapping one or more pages to the logical address space.

Other details relating to modification of data-objects have been described previously.

Conclusion, Ramifications And Scope

Accordingly, the data-processing systems of the various embodiments can be used to efficiently create and manipulate large and complex data-objects.

The data-processing system may be any system that manipulates data and data-objects. The data-processing system may be used in application programs, as well as system programs.

The method may be used in a wide variety of systems. The method may be used in compiled or interpreted programs. The method may be used in compilers, data-base systems, word-processing systems, file-systems, virtual-memory-systems, networking systems and equipment, etc. The method is also useful for implementing data-structures, file-structures and data-bases. The method may also be used to insert additional data in a process stack. This method is also useful to store xml data in an efficient form, wherein the data may be manipulated directly.

The data may be stored in any suitable storage-unit, including memory-regions, files, arrays and other data-structures, on a computer or other computing device, or in a distributed environment.

The invention claimed is:

1. A method for processing data, comprising
   a. providing a storage-unit having a number of sequential logical addresses for storing data;
   b. providing a number of fixed or variable-length data-objects having one or more nested data objects, each data object stored at a number of contiguous logical addresses in the storage-unit; and
   c. modifying the data in the storage-unit, the modification of data characterized by
      i. insertion of additional storage-space at a predetermined logical address in the storage-unit;
      ii. relocation of a number of nested data-objects, stored at or beyond the predetermined logical address, to new logical addresses in the storage unit;
      iii. storage of additional data in the storage-unit, if required; and
      iv. tracking the new addresses or new lengths of one or more nested data-objects;

wherein the storage unit is a virtual memory region, and some or all data stored at or beyond the predetermined logical address is relocated to new logical addresses without accessing the said data, and wherein a number of variable-sized pages are mapped to the virtual memory region, and the size of one or more pages is not a power of two.

2. The method of claim 1, wherein the modification of data is in the nature of at least one of:
   a. insertion of an additional nested data-object in the storage-unit;
   b. removal of a data-object from the storage-unit;
   c. removal of a nested data-object from its parent data-object;
   d. modification of the length of a data-object;
   e. modification of the length of a nested data-object and the length of its parent data-object;
   f. modification of the data-type of a data-object or a nested data object; and
   g. renaming a data-object or a nested data object.

3. A method for processing data, comprising
   a. providing a storage-unit having a number of sequential logical addresses for storing data;
   b. providing a number of fixed or variable-length data-objects having one or more nested data objects, each data object stored at a number of contiguous logical addresses in the storage-unit; and
   c. modifying the data in the storage-unit, the modification of data characterized by
      i. insertion of additional storage-space at a predetermined logical address in the storage-unit;
      ii. relocation of a number of nested data-objects, stored at or beyond the predetermined logical address, to new logical addresses in the storage unit;
      iii. storage of additional data in the storage-unit, if required; and
      iv. tracking the new addresses or new lengths of one or more nested data-objects;

wherein
   a. the storage unit has a number of physical addresses;
   b. the storage unit maintains a number of mapping-entries, each mapping entry for associating a range of physical addresses with a range of logical addresses; and
   c. one or more logical addresses beyond the predetermined logical address are associated with new physical addresses without modifying the corresponding mapping entry.

4. The method of claim 3, wherein the modification of data is in the nature of at least one of:
   a. insertion of an additional nested data-object in the storage-unit;
   b. removal of a data-object from the storage-unit;
   c. removal of a nested data-object from its parent data-object;
   d. modification of the length of a data-object;
   e. modification of the length of a nested data-object and the length of its parent data-object;
   f. modification of the data-type of a data-object or a nested data object; and
   g. renaming a data-object or a nested data object.

5. The method of claim 3, wherein the storage unit is at least one of:
   a. a virtual memory region;
   b. a file; and
   c. a data structure.

6. A device for processing data, comprising
   a. a storage-unit having a number of sequential logical addresses for storing data;

b. a number of fixed or variable-length data-objects having one or more nested data objects, each data object stored at a number of contiguous logical addresses in the storage-unit; and c. a device for modifying the data in the storage-unit, the modification of data characterized by
  i. insertion of additional storage-space at a predetermined logical address in the storage-unit;
  ii. relocation of a number of nested data-objects, stored at or beyond the predetermined logical address, to new logical addresses in the storage unit;
  iii. storage of additional data in the storage-unit, if required; and
  iv. tracking the new addresses or new lengths of one or more nested data-objects;

wherein the storage unit is a virtual memory region, and some or all data stored at or beyond the predetermined logical address is relocated to new logical addresses without accessing the said data, wherein a number of variable-sized pages are mapped to the virtual memory region, and the size of one or more pages is not a power of two.

7. The device of claim 6, wherein the modification of data is in the nature of at least one of:
  a. insertion of an additional nested data-object in the storage-unit;
  b. removal of a data-object from the storage-unit;
  c. removal of a nested data-object from its parent data-object;
  d. modification of the length of a data-object;
  e. modification of the length of a nested data-object and the length of its parent data-object;
  f. modification of the data-type of a data-object or a nested data object; and
  g. renaming a data-object or a nested data object.

8. A device for processing data, comprising
  a. a storage-unit having a number of sequential logical addresses for storing data;
  b. a number of fixed or variable-length data-objects having one or more nested data objects, each data object stored at a number of contiguous logical addresses in the storage-unit; and
  c. a device for modifying the data in the storage-unit, the modification of data characterized by
    i. insertion of additional storage-space at a predetermined logical address in the storage-unit;
    ii. relocation of a number of nested data-objects, stored at or beyond the predetermined logical address, to new logical addresses in the storage unit;
    iii. storage of additional data in the storage-unit, if required; and
    iv. tracking the new addresses or new lengths of one or more nested data-objects;

wherein
  a. the storage unit has a number of physical addresses;
  b. the storage unit maintains a number of mapping-entries for associating the ranges of physical addresses with ranges of logical addresses; and
  c. one or more logical addresses beyond the predetermined logical address are associated with new physical addresses without modifying the corresponding mapping entry.

9. The device of claim 8, wherein the modification of data is in the nature of at least one of:
  a. insertion of an additional nested data-object in the storage-unit;
  b. removal of a data-object from the storage-unit;
  c. removal of a nested data-object from its parent data-object;
  d. modification of the length of a data-object;
  e. modification of the length of a nested data-object and the length of its parent data-object;
  f. modification of the data-type of a data-object or a nested data object; and
  g. renaming a data-object or a nested data object.

10. The device of claim 8, wherein the storage unit is at least one of:
  a. a virtual memory region;
  b. a file; and
  c. a data structure.

* * * * *